US007937197B2

(12) United States Patent
Grimes

(10) Patent No.: US 7,937,197 B2
(45) Date of Patent: May 3, 2011

(54) APPARATUS AND METHODS FOR EVALUATING A DYNAMIC SYSTEM

(75) Inventor: Michael R. Grimes, Saline, MI (US)

(73) Assignee: GM Global Technology Operations LLC

( * ) Notice: Subject to any disclaimer, the term of this patent is extended or adjusted under 35 U.S.C. 154(b) by 0 days.

(21) Appl. No.: 11/031,059

(22) Filed: Jan. 7, 2005

(65) Prior Publication Data

US 2006/0155734 A1 Jul. 13, 2006

(51) Int. Cl.
*G06F 19/00* (2006.01)
*G01M 15/00* (2006.01)

(52) U.S. Cl. ................ 701/29; 701/30; 701/31; 701/32; 701/33; 701/34; 701/58; 701/59; 701/101; 701/102; 73/116; 73/117.2; 73/117.4; 73/118.1; 73/119 R

(58) Field of Classification Search .................... 73/116, 73/117.2, 117.4, 118.1, 119 R; 701/29–34, 701/58, 59, 101, 102, 108, 110; 700/108, 700/110
See application file for complete search history.

(56) References Cited

U.S. PATENT DOCUMENTS

| | | | | | |
|---|---|---|---|---|---|
| 4,937,763 | A | * | 6/1990 | Mott | 702/183 |
| 5,041,976 | A | * | 8/1991 | Marko et al. | 701/29 |
| 5,333,240 | A | * | 7/1994 | Matsumoto et al. | 706/20 |
| 5,402,521 | A | * | 3/1995 | Niida et al. | 706/20 |
| 5,557,686 | A | * | 9/1996 | Brown et al. | 382/115 |
| 5,566,092 | A | * | 10/1996 | Wang et al. | 702/185 |
| 5,809,437 | A | * | 9/1998 | Breed | 701/29 |
| 6,018,696 | A | * | 1/2000 | Matsuoka et al. | 701/207 |
| 6,131,444 | A | * | 10/2000 | Wu et al. | 73/116 |
| 6,175,787 | B1 | * | 1/2001 | Breed | 701/29 |
| 6,526,361 | B1 | | 2/2003 | Jones et al. | 702/63 |
| 6,604,032 | B1 | * | 8/2003 | Moller | 701/29 |
| 6,879,893 | B2 | | 4/2005 | Woodward et al. | 701/29 |
| 6,980,874 | B2 | * | 12/2005 | Cribbs | 700/110 |
| 2003/0158828 | A1 | * | 8/2003 | Ikeda et al. | 706/12 |
| 2003/0225520 | A1 | * | 12/2003 | Hoglund et al. | 702/1 |
| 2004/0111385 | A1 | * | 6/2004 | Starkey | 706/46 |

FOREIGN PATENT DOCUMENTS

| | | | |
|---|---|---|---|
| DE | 4124501 | * | 1/1993 |
| DE | 4124501 | | 9/1994 |
| EP | 0428703 | | 11/1994 |
| EP | 0637739 | | 6/1999 |

* cited by examiner

*Primary Examiner* — Jack Keith
*Assistant Examiner* — Chuong P Nguyen

(57) ABSTRACT

A method of evaluating whether a vehicle under test is operating as intended. Parameters of the vehicle are sampled at a plurality of sample times to obtain a plurality of data samples. Data samples from more than one of the sample times are included in a sample set. The sample set is input to an artificial neural network (ANN). Many time-varying parameters, e.g., response times in motor vehicle systems, can be detected and evaluated.

23 Claims, 5 Drawing Sheets

408

| | TestMotor_1 | TestMotor_2 | TestMotor_3 | TestMotor_4 | TestMotor_5 | Average | | TestMotor_BackEMF_Var | TestMotor_Friction_Var | TestMotor_InertiaResistance_Var | TestMotor_Resistance_Var |
|---|---|---|---|---|---|---|---|---|---|---|---|
| **Entire Data** | | | | | | | | | | | |
| Average | 43 | 44 | 48 | 42 | 46 | 45 | | 201 | 105 | 100 | 107 |
| StdDev | 29 | 29 | 29 | 28 | 29 | 29 | | 87 | 60 | 60 | 60 |
| Min | 4 | 4 | 4 | 4 | 4 | 4 | | 4 | 4 | 6 | 6 |
| Max | 183 | 204 | 222 | 199 | 195 | 201 | | 435 | 285 | 344 | 307 |
| | | | | | | | | | | | |
| **Eliminate First 100 points** | | | | | | | | | | | |
| Average | 43 | 45 | 48 | 43 | 47 | 45 | | 207 | 110 | 101 | 107 |
| StdDev | 30 | 30 | 30 | 29 | 30 | 30 | | 86 | 61 | 62 | 61 |
| Min | 10 | 10 | 8 | 9 | 8 | 9 | | 20 | 10 | 9 | 21 |
| Max | 183 | 204 | 222 | 199 | 195 | 201 | | 435 | 285 | 344 | 307 |
| | | | | | | | | | | | |
| **Eliminate first 400 points** | | | | | | | | | | | |
| Average | 31 | 33 | 38 | 32 | 35 | 34 | | 194 | 99 | 88 | 96 |
| StdDev | 10 | 11 | 12 | 10 | 12 | 11 | | 70 | 48 | 42 | 43 |
| Min | 10 | 11 | 9 | 9 | 8 | 9 | | 20 | 10 | 9 | 28 |
| Max | 79 | 81 | 77 | 69 | 82 | 78 | | 337 | 215 | 209 | 235 |

400

FIG. 5

APPARATUS AND METHODS FOR EVALUATING A DYNAMIC SYSTEM

FIELD OF THE INVENTION

The present invention relates generally to quality control, and more particularly to evaluating vehicles and other dynamic systems.

BACKGROUND OF THE INVENTION

When cars, trucks and other vehicles are manufactured, testing typically is performed on various systems of test vehicles to confirm whether the vehicles meet applicable design specifications and are operating as intended. Many vehicle systems, however, are dynamic; that is, they change in response to various inputs. It can take time for such a system to respond to an input, and it can be difficult to capture such inputs and responses in a meaningful way in a testing procedure.

SUMMARY OF THE INVENTION

The present invention, in one embodiment, is directed to a method of evaluating whether a vehicle under test is operating as intended. Parameters of the vehicle are sampled at a plurality of sample times to obtain a plurality of data samples. Data samples from more than one of the sample times are included in a sample set. The sample set is input to an artificial neural network (ANN).

In another implementation, a method of evaluating whether a response over time of a vehicle under test is within an expected range includes sampling parameters of the vehicle to obtain a plurality of sets of data samples. A first of the sample sets is input to an artificial neural network (ANN). A data sample from the first sample set is included in a second of the sample sets. The second sample set is input to the ANN.

In another configuration, an evaluating apparatus for evaluating responses over time by a subject vehicle includes a sampling apparatus that obtains a plurality of data samples from the vehicle. A processor inputs the data samples as a plurality of sample sets to a self-organizing map (SOM). The processor includes one of the data samples in more than one of the sample sets.

In yet another configuration, the invention is directed to an evaluating apparatus for evaluating one or more time-varying parameters in a system under test. A sampling apparatus obtains from the system a plurality of data samples describing the parameters at a plurality of sample times. A processor includes a time series of the data samples in a sample set, and inputs the sample set to a self-organizing map (SOM).

Further areas of applicability of the present invention will become apparent from the detailed description provided hereinafter. It should be understood that the detailed description and specific examples, while indicating exemplary embodiments of the invention; are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a graph of data derived from the data shown in FIG. 4 relating to using a SOM according to one exemplary implementation of the present invention.

DETAILED DESCRIPTION OF EXEMPLARY EMBODIMENTS

The following description of various embodiments of the present invention is merely exemplary in nature and is in no way intended to limit the invention, its application, or uses. The present invention, in one implementation, is directed to using an artificial neural network (ANN) to provide metrics relevant to a dynamic system, i.e., a system that changes over time. In a dynamic system, it can take time for a parameter of the system to respond to an input to the system.

When the ANN is implemented in accordance with one embodiment of the present invention, a relationship may be detected between a system input and a system output that occurs later in time. Although implementations of the present invention are described in connection with a two-dimensional self-organizing map (SOM), the invention is not so limited. Implementations also are contemplated in connection with other types of SOMs and other types of ANNs. Additionally, although embodiments of the invention are described in connection with evaluating vehicle systems, the invention may be practiced in connection with various dynamic and/or static systems, including but not limited to vehicle systems.

Figure 1:
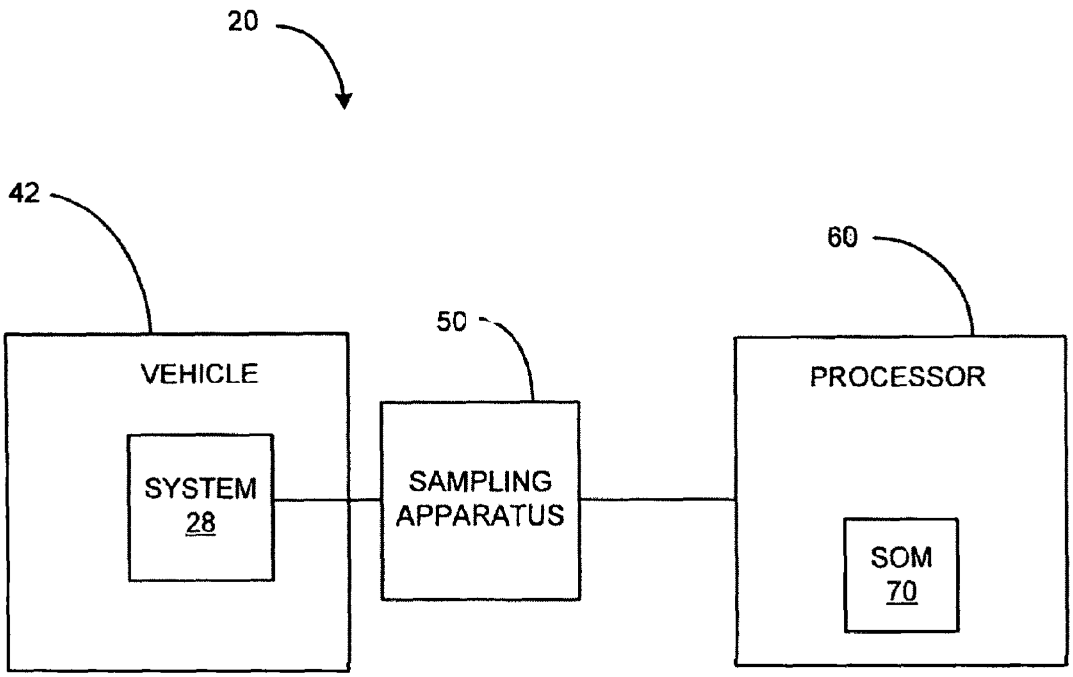
FIG. 1 is a diagram of an evaluation apparatus for evaluating a subject vehicle system according to one embodiment of the present invention.

An embodiment of an evaluation apparatus is indicated generally in FIG. 1 by reference number 20. The apparatus 20 is used for evaluating a subject system 28, for example, a motor and/or other component(s) of a vehicle 42. A sampling apparatus 50 obtains a plurality of data samples from the system 28. Such samples may be obtained from the vehicle 42, for example, via engine sensors, sensing circuits and the like and may describe such system parameters as back EMF, resistance, friction, etc. As further described below, a processor 60 inputs the data samples as a plurality of sample sets to an ANN 70, for example, a SOM. In one configuration and as further described below, the processor 60 includes one of the data samples in more than one of the sample sets.

Generally, in an ANN, processing elements ("neurons") are connected to other neurons of the ANN with varying strengths of connection. As the connections are adjusted, the ANN "learns" to output results appropriate to the task at hand. The self-organizing map (SOM) 70 is a type of ANN that is useful in performing quality control. The SOM 70 can be used, for example, to identify what is a "normal" result of a manufacturing process. A "normal" result means, for example, that all manufactured parts are within specification and operating as designed. In the present configuration, the SOM 70 is trained to "remember" data between one sample set and another sample set, as further described below.

Figure 2:
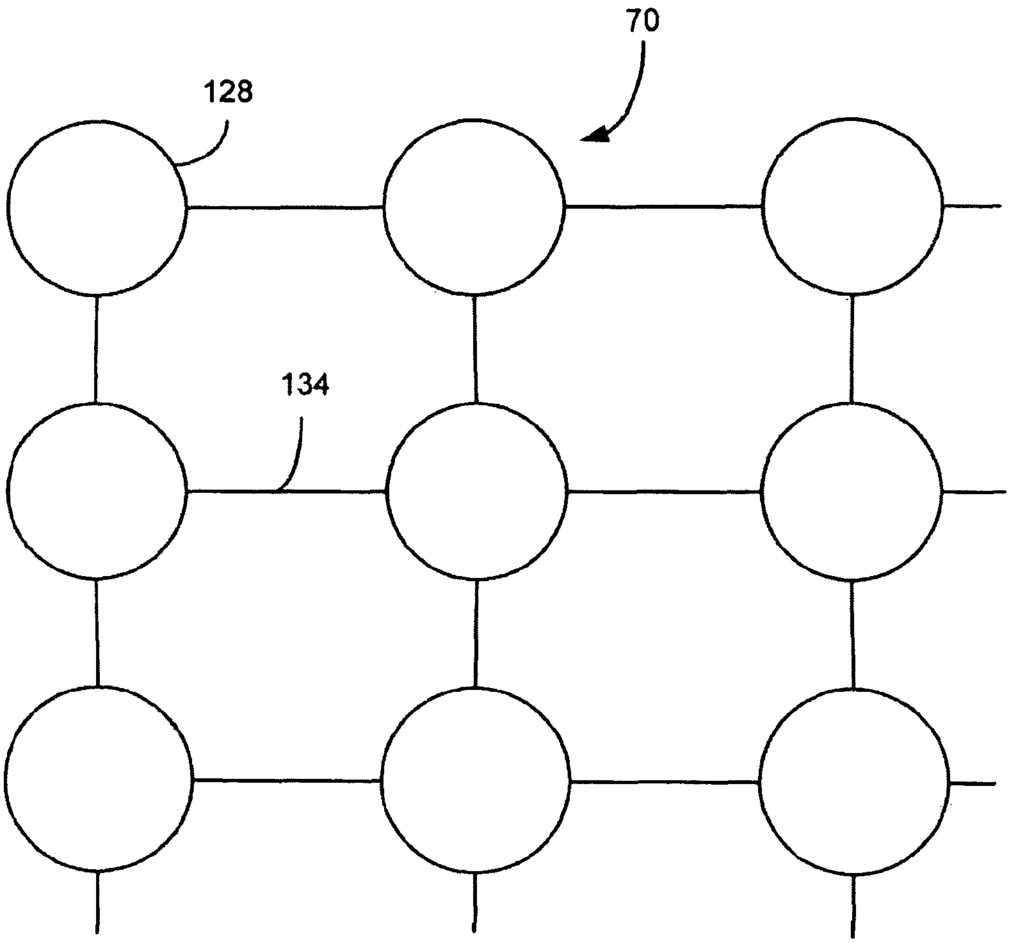
FIG. 2 is a diagram of a self-organizing map (SOM) according to one embodiment of the present invention.

The SOM 70 is shown in greater detail in FIG. 2. The SOM 70 includes a plurality of processing elements or neurons 128, each neuron connected to a neighboring neuron 128 by a neighborhood relation 134. The neurons 128 and relations 134 define a topology (also referred to as a structure) of the SOM 70.

Before being used to evaluate the system 28, the SOM 70 is trained in the following manner. A plurality of sample sets are input to the SOM 70. A sample set may be, e.g., a vector of data values collected from sampling points relative, for example, to a motor and/or other component(s) of the vehicle 42 as previously described with reference to FIG. 1. During training, the SOM 70 receives a plurality of sample sets, each sample set taken, for example, from a "normal" vehicle, e.g., a vehicle pre-designated as meeting a set of given specifications. Based on the data values in such a sample set, a neuron 128 may update weights of one or more neighborhood relations 134.

The foregoing process of sampling and inputting sample sets to the SOM 70 is repeated for a number of sample sets appropriate to train the SOM 70 to recognize, for example, "normal" interrelationships among data values taken from "normal" vehicles. Eventually the neurons 128 tend to "self-organize" by re-weighting neighborhood relations 134, such that distances between the neurons 128 are reduced.

After having been trained in the foregoing manner, the SOM 70 may be used to evaluate a system. The SOM may be exposed, for example, to data taken from subject vehicles under test, e.g., data taken from the system 28 of the vehicle 42. For each sample set taken from subject vehicles, the SOM may locate a neuron that best matches the data in the sample set. The SOM also can indicate how close the data is to the closest neuron. By aggregating such SOM results, one can provide a metric to indicate whether a vehicle under test is operating as intended. Thus a vehicle that operates outside design expectations can be identified.

The system 28 is sampled to obtain a plurality of sets of data samples, as previously described with reference to FIG. 1. The sample sets are input to the SOM 70, which determines, for each sample set, which of the neurons 128 is closest to the input data.

Figure 3:
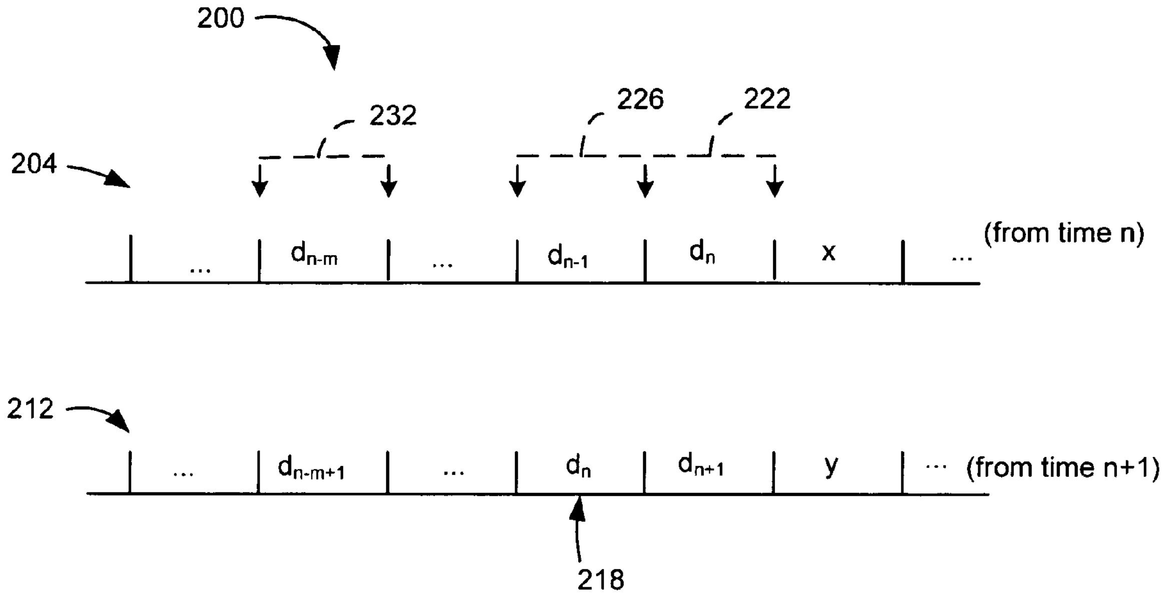
FIG. 3 is a diagram of sample sets of data input to a SOM according to one embodiment of the present invention.

Exemplary sample sets of data in accordance with one implementation of the present invention are indicated generally in FIG. 3 by reference number 200. First and second sample sets 204 and 212 each include a plurality of data values 218 sampled from the system 28 as previously described. Specifically, in one implementation of the present invention, the system 28 is sampled at a plurality of sample times to obtain at least several of the data samples 218. For example, the sample set 204 includes, at a location 222, a data sample $d_n$ taken by the sampling apparatus 50 from the system 28 at a sample time n. The data sample $d_n$ represents, for example, a voltage measured in the system 28. It should be noted that the sample set 204 also includes, in a location 226, a data sample $d_{n-1}$ taken by the sampling apparatus 50 from the system 28 at a sample time n−1 immediately preceding the sample time n. Thus one or more previously measured voltage values may be included in the set 204. For example, the set 204 includes voltage values $d_n, \ldots d_{n-m}$ taken at sample times n, . . . n−m. The sample times n, . . . n−m may be separated, for example, by predetermined time intervals which may vary according to a type of parameter being sampled.

Accordingly, the sample set 212 includes, at the location 222, a data sample $d_{n+1}$ taken by the sampling apparatus 50 from the system 28 at a sample time n+1 following the sample time n. In the same manner, the locations 226 and 232 of the sample set 212 include data samples $d_n$ and $d_{n-m+1}$ respectively, taken at sample times n and n−m+1.

Thus the processor 60 includes data samples from more than one of the sample times in a sample set, which is input to the SOM 70. The SOM 70 can be provided with a time series of data in 0 each sample set. The SOM 70 thereby can be trained to evaluate relationships, for example, between an input to the system at time n−m and an output of the system at time n. Expressed differently, a sample set n is input to the SOM 70. At least a portion of data from the sample set n is included in a sample set n+1 which is input to the SOM.

An example of using a SOM in accordance with one implementation of the present invention shall now be described. Nine motors were simulated in a test as further described below. Five of the motors (specifically, TestMotor_1 through TestMotor_5) were pre-designated as being within specification (i.e., "normal"). The other four motors (specifically, TestMotor_BackEMF_Var, TestMotor_Friction_Var, Test Motor_InertiaResistance_Var, and TestMotor_Resistance_Var) included parameters that were pre-set to values outside a "normal" distribution. For example, TestMotor_BackEMF_Var had back EMF gain pre-set outside the "normal" distribution.

A SOM processed input representing 1,000 sample times, each sample time separated from a previous and/or a subsequent sample time by one second. Sample data values input to the SOM for each motor and for each sample time included an input reference voltage Vc (ref). Sample data values input to the SOM also included such motor outputs as the last five samples of voltage, the last five samples of current, and the last five samples of motor speed.

Figure 4:
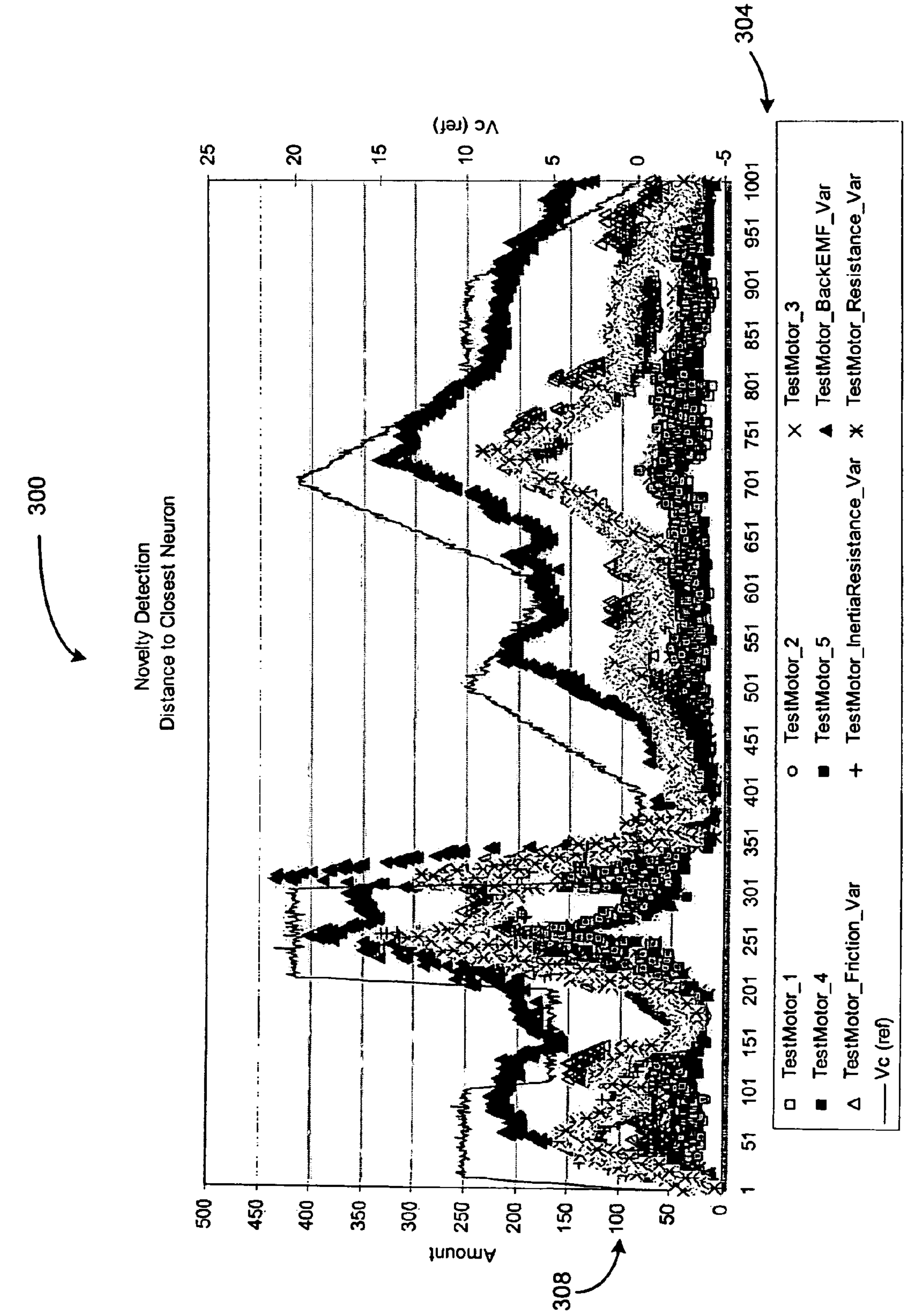
FIG. 4 is a graph of data relating to a simulation in which a SOM was used according to one exemplary implementation of the present invention.

A graph of data relating to the above described simulation is indicated generally in FIG. 4 by reference number 300. The graph 300 indicates the foregoing sample times along an x-axis 304 and distance to the closest neuron of the SOM along a y-axis 308. It can be seen that for the "normal" motors TestMotor_1 through TestMotor_5, distances to the closest neuron are less than such distances for the other four motors having parameter values outside the "normal distribution. In other words, a motor exhibiting, for example, a non-"normal" output within a several-second time period after a sampling of Vc(ref) could be distinguished using the SOM.

Many different metrics are possible using various implementations of the present invention. For example, a chart indicated generally in FIG. 5 by reference number 400 displays several types of data, including averages 408 of results from all 1,000 sample times indicated in FIG. 4. Thus one can compare average distances to the closest neurons for all of the foregoing data shown in FIG. 4.

Embodiments of the foregoing apparatus and methods allow a SOM to be utilized with respect to a dynamic system such as a car or truck to identify variation in mass production. ANNs can be used to evaluate several parameters at once and thus are capable of detecting relatively subtle variations or combinations of parameters that might not be detected by single-parameter comparisons. SOMs can learn what is "normal" or expected and then compare data from mass-produced vehicles to more easily discover non-obvious variation in vehicle parameters.

The foregoing methods and apparatus can be applied at vehicle pilot production to determine whether pilot vehicles perform the same as development vehicles. Embodiments also can be used at end-of-line testing to identify variations in a manufacturing process. Data gathered from vehicles in the field could be compared to data collected from dealers or from telematic data collection systems. Many time-varying parameters, including but not limited to various response times, could be detected and evaluated. Additionally, information gained from evaluating such parameters could be useful in detecting environmental and/or application-varying parameters such as temperature, humidity, and/or parameters connected with vehicle operation in mountainous areas.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. An evaluating apparatus for evaluating responses over time by a subject vehicle, said apparatus comprising:
   a sampling apparatus configured to obtain a first plurality of data samples from the vehicle; and
   a processor that includes a self-organizing map (SOM), the processor is configured to input the first plurality of data samples as a first plurality of sample sets to the SOM,
   wherein said processor is configured to include one of the first plurality of data samples in more than one of the first plurality of sample sets, and
   wherein said processor is configured to train the SOM to remember normal data from the first plurality of sample sets by recognizing normal interrelationships among the first plurality of data samples.

2. The evaluating apparatus of claim 1 wherein said processor includes the one of the first plurality of data samples in more than one of the first plurality of sample sets based on a sample time associated with the one of the first plurality of data samples.

3. The evaluating apparatus of claim 1 wherein one of the first plurality of sample sets comprises data samples obtained by said sampling apparatus at a plurality of sample times,
   wherein a data sample of a first sample set is obtained at one of the plurality of sample times and is included in a second sample set, and
   wherein the second sample set is obtained at another one of the plurality of sample times.

4. The evaluating apparatus of claim 1 wherein said processor is configured to evaluate relationships between data samples of a second plurality of samples sets based on the SOM.

5. The evaluating apparatus of claim 1 wherein the subject vehicle includes a motor and said sampling apparatus is configured to obtain the first plurality of data samples from sensors of the motor.

6. The evaluating apparatus of claim 1 wherein said processor is external from said vehicle.

7. The evaluating apparatus of claim 1 wherein said processor is remote from said vehicle.

8. The evaluating apparatus of claim 1 wherein said first plurality of sample sets are associated with different vehicles.

9. The evaluating apparatus of claim 1 wherein said first plurality of sample sets comprise:
   a first sample set associated with training based on data from a first vehicle; and
   a second sample set associated with testing of a second vehicle.

10. The evaluating apparatus of claim 1 wherein said processor is configured to identify variations in a manufacturing process based on said SOM.

11. The evaluating apparatus of claim 1 wherein said processor is configured to detect that said vehicle is operating outside design specifications based on the normal data from the first plurality of sample sets.

12. The evaluating apparatus of claim 1 wherein said processor is configured to determine that the vehicle is operating outside design specifications based on said SOM, and
   wherein said SOM includes a data set collected during training with another vehicle.

13. The evaluating apparatus of claim 1 wherein said processor is configured to detect variations between data sets collected from different vehicles based on said SOM.

14. The evaluating apparatus of claim 1 wherein the processor is configured to generate and adjust neurons based on the first plurality of sample sets, and
   wherein the processor is configured to update weights of relations between the neurons.

15. The evaluating apparatus of claim 14 wherein the processor is configured to self-organize the neurons by re-weighting the relations to reduce distances between the neurons.

16. The evaluating apparatus of claim 1 wherein the processor is configured to generate and locate a neuron that best matches the first plurality of sample sets based on the SOM.

17. The evaluating apparatus of claim 1 wherein the processor is configured to generate neurons based on the first plurality of sample sets, and
   wherein the processor is configured to determine distances between the data samples of the first plurality of sample sets and a neuron based on the SOM.

18. The evaluating apparatus of claim 1 wherein the SOM comprises distances between the data samples of the first plurality of sample sets and neurons.

19. The evaluating apparatus of claim 1 wherein the processor is configured to generate neurons based on the first plurality of sample sets, and
   wherein the processor is configured to determine which one of the neurons is closest to the first plurality of sample sets based on the SOM.

20. The evaluating apparatus of claim 1 wherein the first plurality of sample sets is associated with a first engine,
   wherein the processor is configured to input a second plurality of data samples as a second plurality of sample sets associated with a second engine to the SOM,
   wherein the first plurality of sample sets includes an input reference voltage, and
   wherein the second plurality of sample sets includes the input reference voltage.

21. The evaluating apparatus of claim 1 wherein the processor is configured to input sample sets for a plurality of engines to the SOM, and
   wherein the processor is configured to determine whether output data from an engine of the vehicle is normal based on the SOM.

22. The evaluating apparatus of claim 21 wherein the sampling apparatus is configured to sample the output data within a predetermined period after a sampling of a reference voltage, and
   wherein each of the input sample sets includes the reference voltage.

23. The evaluating apparatus of claim 3 wherein the processor is configured to train the SOM to evaluate a relationship between an input of an engine of the vehicle at a first time and an output of the engine at a second time based on the data sample of the first sample set.

* * * * *